United States Patent
Paatero et al.

(10) Patent No.: US 11,757,302 B2
(45) Date of Patent: Sep. 12, 2023

(54) POWER SUPPLY ASSEMBLY AND SWITCH ASSEMBLY

(71) Applicant: ABB Schweiz AG, Baden (CH)

(72) Inventors: Esa-Kai Paatero, Helsinki (FI); Alessandro Antoniazza, Cambiasca (IT); Matteo Cogliati, Arizzano-Verbania (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/663,548

(22) Filed: May 16, 2022

(65) Prior Publication Data
US 2022/0368155 A1 Nov. 17, 2022

(30) Foreign Application Priority Data
May 17, 2021 (EP) ..................................... 21174097

(51) Int. Cl.
*H02J 9/06* (2006.01)
*H02J 3/36* (2006.01)
*H02M 3/156* (2006.01)

(52) U.S. Cl.
CPC ................ *H02J 9/062* (2013.01); *H02J 3/36* (2013.01); *H02M 3/156* (2013.01)

(58) Field of Classification Search
CPC ...... G01R 19/1659; G05F 1/10; H02J 3/0075; H02J 3/46; H02J 9/06; H02J 9/061; H02J 9/062; H02J 9/068; H03K 17/125; H03K 17/14; H03K 17/725; H03K 2217/0009; H02M 1/327; H02M 5/458; H02M 5/4585; Y02E 40/70; Y04S 10/50
See application file for complete search history.

(56) References Cited

U.S. PATENT DOCUMENTS

| | | | | |
|---|---|---|---|---|
| 2019/0190311 A1* | 6/2019 | Kao | ........................ | H02J 9/061 |
| 2020/0186147 A1* | 6/2020 | Shigeta | ..................... | G05F 1/10 |

OTHER PUBLICATIONS

Vertiv; "Performance Improvements with Sharing Inductors in Distributed Static Switch UPS Systems—Simplified Installation and Improved Performance"; Vertiv Group Corporation; Jan. 1, 2019; 14 Pages.
European Search Report; Application No. EP 21 17 4097; dated Sep. 30, 2021; 2 Pages.

* cited by examiner

*Primary Examiner* — Elim Ortiz
(74) *Attorney, Agent, or Firm* — WHITMYER IP GROUP LLC

(57) ABSTRACT

A power supply assembly including a primary source connection, a secondary source connection, a load connection, a primary current supply route, a supply switch system, and a converter system. The supply switch system is electrically located in the primary current supply route, and adapted for disconnecting the primary source connection from the load connection, the supply switch system including a plurality of supply switch units connected in parallel, each of the supply switch units including a controllable semiconductor switch. The power supply assembly includes a series impedance system having at least one series impedance member, and adapted to provide a balancing voltage drop for each of the parallel connected supply switch units of the supply switch system, wherein the balancing voltage drop is in series with a corresponding supply switch unit.

12 Claims, 3 Drawing Sheets

POWER SUPPLY ASSEMBLY AND SWITCH ASSEMBLY

TECHNICAL FIELD

The present invention relates to a power supply assembly, and to a switch assembly.

BACKGROUND

It is known to provide an uninterruptible power supply assembly with a converter system and a by-pass switch system adapted for by-passing the converter system and supplying power directly from a primary alternating current supply to a load during an energy saver mode. The by-pass switch system comprises a plurality of parallel connected controllable semiconductor switches. An example of such known uninterruptible power supply assembly is described in publication US2017366041. Examples of known switch assemblies are described in publications US2019/190311, XP055843768 and US2020/186147.

One of the problems associated with the above known power supply assembly is current sharing between the parallel connected controllable semiconductor switches of the by-pass switch system. Controllable semiconductor switches typically used in the by-pass switch systems are naturally commutated and have a negative temperature coefficient of resistance.

A controllable semiconductor switch with a lower forward conduction voltage will conduct more current than a parallel connected controllable semiconductor switch with a higher forward conduction voltage. Due to the higher current, the controllable semiconductor switch with a lower forward conduction voltage will get hotter and, due to the negative temperature coefficient of resistance, will conduct even larger current share of the total current.

SUMMARY

An object of the present invention is to provide a power supply assembly so as to solve the above problem. Another object of the present invention is to provide a switch assembly for a power supply assembly, but usable also in other type of assemblies in which current is shared between parallel connected controllable semiconductor switches.

The objects of the invention are achieved by a power supply assembly and a switch assembly described in the following.

The invention is based on a series impedance system adapted to provide a balancing voltage drop for each of the parallel connected controllable semiconductor switches, wherein the balancing voltage drop is in series with a corresponding controllable semiconductor switch, and is provided by at least one series impedance member. The balancing voltage drop automatically increases when a current through the controllable semiconductor switch increases.

An advantage of the invention is that a current unbalance between parallel connected controllable semiconductor switches is compensated by the series impedance system which is a passive system and provides a predictable balancing voltage drop for each of the semiconductor switches, and maintains a current for each of the semiconductor switches below a predefined safe operating maximum value.

In a switch assembly according to the invention, the parallel connected controllable semiconductor switches are accommodated in a plurality of supply switch modules.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
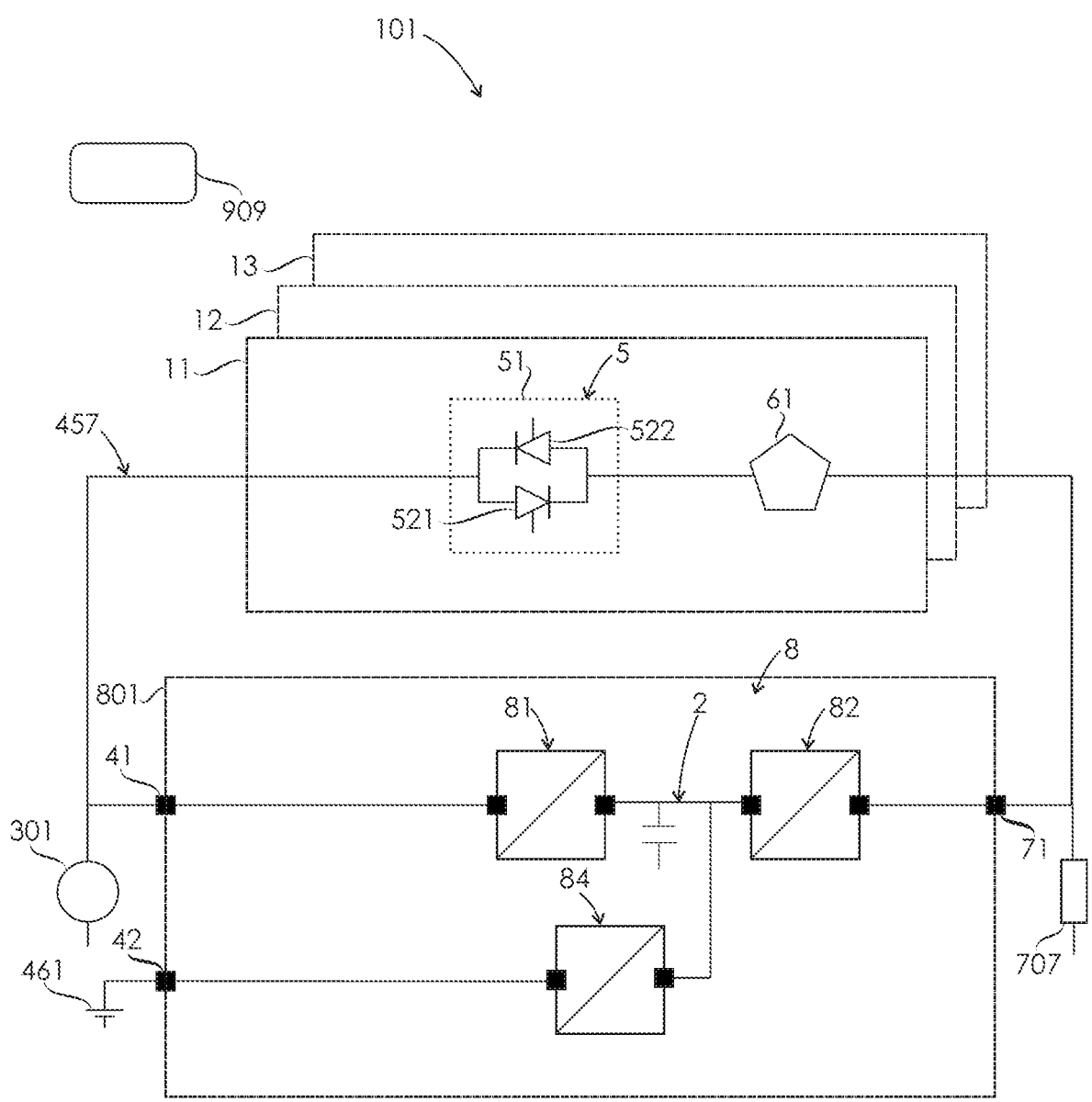
FIG. 1 shows a simplified connection diagram of a power supply assembly according to an embodiment of the invention.

FIG. 1 shows a simplified connection diagram of a power supply assembly 101 comprising a primary source connection 41, secondary source connection 42, a load connection 71, a primary current supply route 457, a supply switch system 5, a series impedance system, a supply switch module system, a converter system 8, a measurement system, and a control system 909.

The primary source connection 41 is adapted to be connected electrically to a primary alternating current supply 301. The secondary source connection 42 is a direct current connection, and is adapted to be connected electrically to a secondary current supply 461. The load connection 71 is adapted to be connected electrically to an alternating current load 707. The primary current supply route 457 electrically conductively connects the primary source connection 41 to the load connection 71, and is adapted for supplying power from the primary source connection 41 to the load connection 71 during an energy saver mode of the power supply assembly 101. In an alternative embodiment, the primary current supply route is also adapted for supplying power from the primary source connection to the load connection during a situation in which the converter system is overloaded.

The supply switch system 5 is electrically located in the primary current supply route 457, and is adapted for controllably connecting the primary source connection 41 to the load connection 71, and disconnecting the primary source connection 41 from the load connection 71.

The converter system 8 comprises a load supply converter 82, a DC link 2, a direct current converter 84, and a source side converter 81. The DC link 2 comprises DC link capacitance, and is connected electrically between the source side converter 81 and the load supply converter 82. The load supply converter 82 is connected electrically between the DC link 2 and the load connection 71, the load supply converter 82 being adapted to supply power from the DC link 2 to the load connection 71. The source side converter 81 is connected electrically between the primary source connection 41 and the DC link 2. The direct current converter 84 is connected electrically between the secondary source connection 42 and the DC link 2.

The converter system 8 is electrically connected between the secondary source connection 42 and the load connection 71 such that during a first converter supply mode, the converter system 8 is adapted for supplying power from the secondary source connection 42 to the load connection 71 through the direct current converter 84 and the load supply converter 82.

The measurement system is adapted to provide information relating to electrical magnitudes of the power supply assembly 101. The electrical magnitudes of the power supply assembly 101 comprise voltage and current present at the load connection 71, and voltage and current present at the primary current supply route 457. In an alternative embodiment, the electrical magnitudes of the power supply assembly measured by the measurement system comprise voltage and current present at the load connection, or voltage and current present at the primary current supply route.

The control system 909 is adapted to control the supply switch system 5 and the converter system 8. The control system 909 is adapted to provide a centralized control of the supply switch system 5. In an alternative embodiment, the control system is a distributed control system whose components are located in different modules of the power supply assembly.

The control system 909 is adapted to provide a first supply transition operation for transferring from the energy saver mode to the first converter supply mode. During the energy saver mode the converter system 8 is in an instant standby state, in which it is adapted to start supplying power to the load connection 71 in less than one millisecond. Further, during the first converter supply mode of the power supply assembly 101, the supply switch system 5 is in a nonconducting state.

The supply switch system 5 comprises three supply switch units 51 connected in parallel. Each of the supply switch units 51 is a bidirectional switch unit comprising a first semiconductor switch member 521 and a second semiconductor switch member 522 connected antiparallel with each other. The first semiconductor switch member 521 and the second semiconductor switch member 522 are controllable switch members adapted to be individually controlled by the control system 909.

The first semiconductor switch member 521 and the second semiconductor switch member 522 are thyristors. In alternative embodiments, controllable semiconductor switches of the supply switch system comprise IGCTs, GTOs or FETs, or other naturally or gate commutated switches.

In an embodiment, each supply switch unit comprises a mechanical circuit breaker connected in parallel with the controllable semiconductor switch of the supply switch unit. The control system is adapted to control the mechanical circuit breaker independently from the controllable semiconductor switch.

The series impedance system has a series impedance member 61 for each supply switch unit 51 such that the series impedance member 61 is connected in series with the supply switch unit 51. It can be said that the series impedance system is connected in series with the supply switch system 5.

The series impedance system is adapted to provide a balancing voltage drop for each of the supply switch units 51. The balancing voltage drop is in series with a corresponding supply switch unit 51, and is provided by the series impedance member 61 connected in series with the supply switch unit 51.

Each of the series impedance members 61 comprises a series inductance member. An inductance of each of the series inductance members is in a range of 2-40 μH. In an alternative embodiment, each of the series impedance members comprises a series resistor member. In another alternative embodiment the series impedance member for each supply switch unit comprises conductors electrically connecting the supply switch unit to the primary source connection and the load connection. Each real conductor, except for superconductors of course, has some resistance and inductance, and those natural resistance and inductance can be utilized as part of the series impedance system.

In an embodiment, the balancing voltage drop is in a range of 30-400 mV at a nominal current of the supply switch unit. In another embodiment, the balancing voltage drop is in a range of 75-400 mV at a nominal current of the supply switch unit. In a further alternative embodiment, the balancing voltage drop is in a range of 100-300 mV at a nominal current of the supply switch unit. A magnitude of an optimal balancing voltage drop depends on a type of a controllable semiconductor switch since different types of switches have different forward conduction voltages.

The supply switch module system comprises three supply switch modules 11, 12 and 13 such that each of the supply switch modules accommodates a supply switch unit 51 and a corresponding series impedance member 61. Each of the supply switch modules 11, 12 and 13 comprises a casing inside which the supply switch unit 51 and the series impedance member 61 are located. The supply switch modules 11, 12 and 13 are identical to each other.

In an alternative embodiment, the supply switch module system comprises a plurality of supply switch modules, and the supply switch system is accommodated in the plurality of supply switch modules. In another embodiment, the series impedance system is accommodated in a plurality of series impedance modules.

The converter module system comprises a converter module 801 which accommodates the converter system 8. In an alternative embodiment, the power supply assembly comprises a plurality of parallel connected converter modules.

Figure 2:
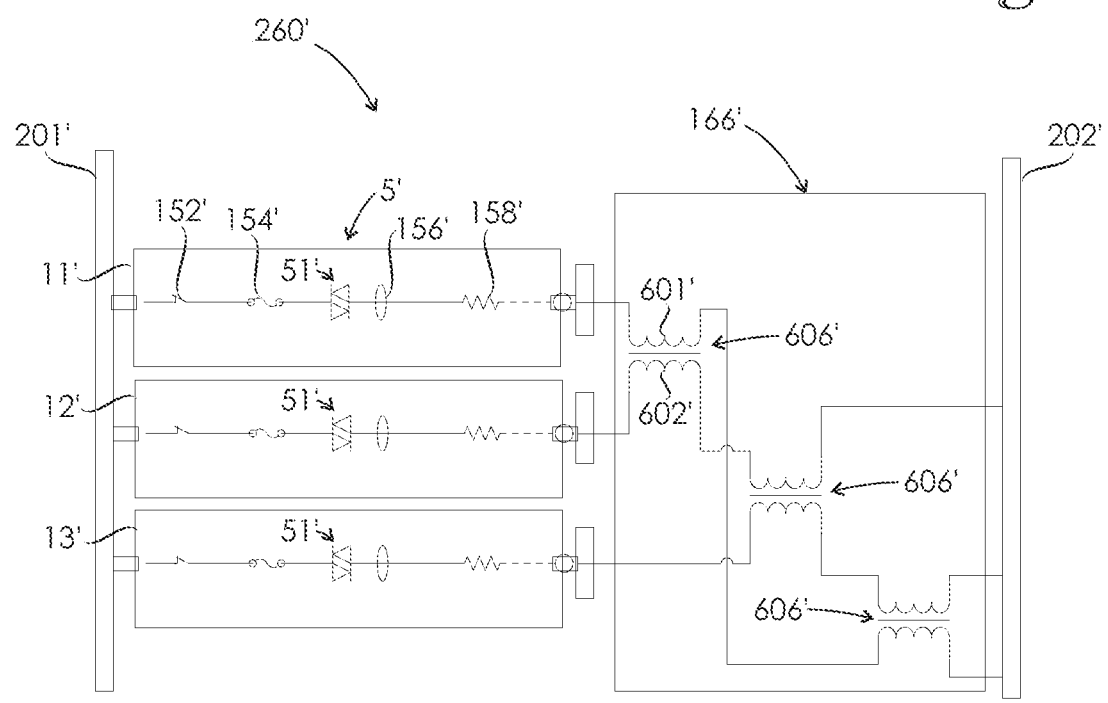
FIG. 2 shows a switch assembly according to an embodiment of the invention.

FIG. 2 shows a switch assembly 260' according to an embodiment of the invention. The switch assembly 260' comprises an input busbar 201', an output busbar 202', three supply switch modules 11', 12' and 13', and three coupled inductors 606'. A supply switch system 5' of the switch assembly 260' comprises three parallel connected supply switch units 51' such that each of the supply switch modules 11', 12' and 13' accommodates one supply switch unit 51'.

In addition to the supply switch unit 51', each of the supply switch modules 11', 12' and 13' comprise a back feed switch 152', a fuse 154', a current measurement member 156' and a series resistance member 158' connected in series with the supply switch unit 51'. The back feed switch 152' is a mechanical circuit breaker. The series resistance member 158' is part of the series impedance system.

The switch assembly 260' comprises three supply switch unit pairs. A first supply switch unit pair includes supply switch units 51' of supply switch modules 11' and 12'. A second supply switch unit pair includes supply switch units 51' of supply switch modules 12' and 13'. A third supply switch unit pair includes supply switch units 51' of supply switch modules 13' and 11'.

In a general case, a number $T_n$ of supply switch unit pairs may be calculated by an equation $$T_n = \frac{n(n-1)}{2},$$

in which n is a number of parallel connected supply switch units.

The series impedance system of the switch assembly 260' comprises a coupled inductor 606' for each of the three supply switch unit pairs such that each of the coupled inductors 606' comprises a first series inductance member 601' connected in series with one supply switch unit 51' of the supply switch unit pair, and a second series inductance member 602' connected in series with the other supply switch unit 51' of the supply switch unit pair. There is an inductive coupling between the first series inductance member 601' and the second series inductance member 602'. It can be said that the series impedance system is connected in series with the supply switch system 5'.

The inductive coupling between the first series inductance member 601' and the second series inductance member 602' is provided by a magnetic core common to the first series inductance member 601' and the second series inductance member 602'. Inductances of the first series inductance member 601' and the second series inductance member 602', and a coupling coefficient $k_{12}$ between the first series inductance member 601' and the second series inductance member 602' are selected such that a desired balancing voltage drop is achieved.

The switch assembly 260' comprises an impedance module 166' in which the three coupled inductors 606' of the series impedance system are accommodated.

The supply switch module system of the power supply assembly of FIG. 1 could be replaced be the switch assembly 260' of FIG. 2. In that case, the input busbar 201' is connected to the primary source connection 41, and the output busbar 202' is connected to the load connection 71. In some embodiments, series impedance members as shown in FIG. 1 are used together with coupled inductors as shown in FIG. 2.

Figure 3:
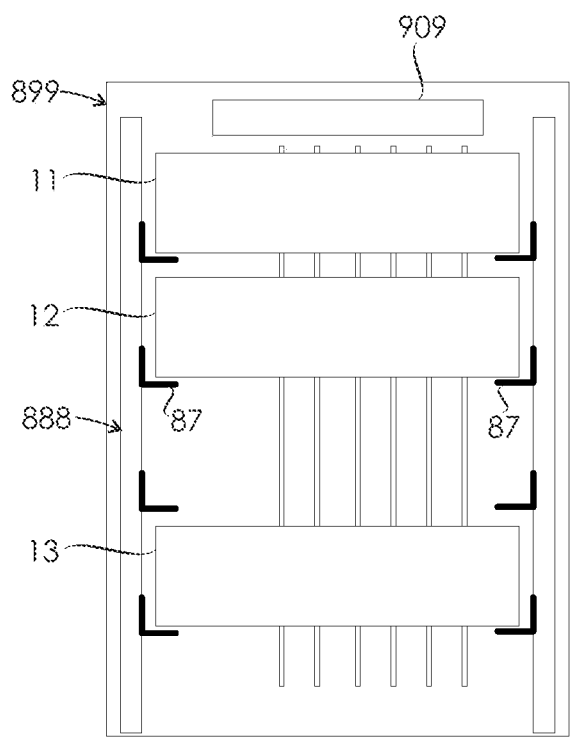
FIG. 3 shows supply switch modules of the power supply assembly of FIG. 1 mounted in a rack.

FIG. 3 shows supply switch modules 11, 12 and 13 of the power supply assembly of FIG. 1 mounted in a rack 888. The rack 888 is installed in a cabinet 899. The rack 888 comprises four pairs of slides 87. Each of the supply switch modules 11, 12 and 13 is mounted on one pair of slides 87. The rack 888 has one empty pair of slides. In alternative embodiments, also other modules, such as converter modules and/or impedance modules are mounted in racks.

Figure 4:
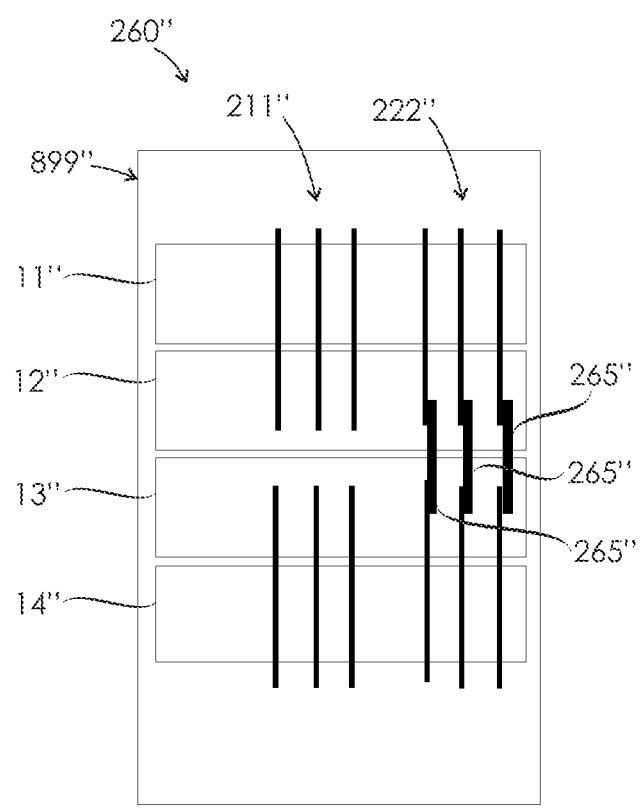
FIG. 4 shows a back view of a switch assembly according to an alternative embodiment of the invention.

FIG. 4 shows a back view of a switch assembly 260" comprising four supply switch modules 11", 12", 13" and 14". There are two module subsets, a first module subset comprising supply switch modules 11" and 12", and a second module subset comprising supply switch modules 13" and 14". Both an input busbar system 211" and output busbar system 222" are split in two such that they both comprise a first subsystem and a second subsystem electrically isolated from each other.

Inputs of the supply switch modules 11" and 12" are connected to the first subsystem of the input busbar system 211", and inputs of the supply switch modules 13" and 14" are connected to the second subsystem of the input busbar system 211". Therefore, inputs of the supply switch modules 11" and 12" are electrically isolated from the inputs of the supply switch modules 13" and 14".

Outputs of the supply switch modules 11" and 12" are connected to the first subsystem of the output busbar system 222", and outputs of the supply switch modules 13" and 14" are connected to the second subsystem of the output busbar system 222". The first and second subsystems of the output busbar system 222" are electrically connected to each other by coupler members 265". The coupler members 265" are removable members which are adapted to be connected to the busbars by screws. The coupler members 265" enable configuring the input busbar system 211" and the output busbar system 222" for different sets of modules.

It will be obvious to a person skilled in the art that the inventive concept can be implemented in various ways. The invention and its embodiments are not limited to the examples described above but may vary within the scope of the claims.

The invention claimed is:

1. A power supply assembly comprising:
a primary source connection adapted to be connected electrically to a primary alternating current supply;
a secondary source connection adapted to be connected electrically to a secondary current supply;
a load connection adapted to be connected electrically to an alternating current load;
a primary current supply route electrically conductively connecting the primary source connection to the load connection, wherein the primary current supply route is adapted for supplying power from the primary source connection to the load connection;
a supply switch system electrically located in the primary current supply route, and adapted for disconnecting the primary source connection from the load connection, the supply switch system comprising a plurality of supply switch units connected in parallel, each of the supply switch units comprising a controllable semiconductor switch;
a converter system electrically connected between the secondary source connection and the load connection, and adapted for supplying power from the secondary source connection to the load connection during a first converter supply mode; and
a control system adapted to control the supply switch system and the converter system,
wherein the power supply assembly comprises a series impedance system which has at least one series impedance member and adapted to provide a balancing voltage drop for each of the parallel connected supply switch units of the supply switch system, wherein the series impedance system is in series with the supply switch system, and the balancing voltage drop is in a range of 30-400 mV at a nominal current of the supply switch unit, and
wherein the at least one series impedance member comprises at least one series inductance member,
wherein the supply switch system comprises at least one supply switch unit pair each of which comprises two parallel connected supply switch units of the supply switch system, and the series impedance system comprises a coupled inductor for each of the at least one supply switch unit pair such that each of the coupled inductors comprises a first series inductance member connected in series with one supply switch unit of the supply switch unit pair, and a second series inductance member connected in series with the other supply switch unit of the supply switch unit pair, wherein there is a inductive coupling between the first series inductance member and the second series inductance member.

2. The power supply assembly according to claim 1, wherein the power supply assembly comprises:
a supply switch module system comprising a plurality of supply switch modules such that the supply switch system is accommodated in the plurality of supply switch modules; and
a converter module system comprising at least one converter module such that the converter system is accommodated in the at least one converter module.

3. The power supply assembly according to claim 2, wherein the supply switch module system comprises a supply switch module for each supply switch unit such that each supply switch unit is accommodated in a corresponding supply switch module.

4. The power supply assembly according to claim 1, wherein the control system is adapted to provide a centralized control of the supply switch system.

5. The power supply assembly according to claim 1, wherein an inductance of the at least one series inductance member is in a range of 2-40 pH.

6. The power supply assembly according to claim 1, wherein the inductive coupling between the first series inductance member and the second series inductance member is provided by a magnetic core common to the first series inductance member and the second series inductance member.

7. The power supply assembly according to claim 1, wherein the power supply assembly comprises an impedance module system comprising at least one impedance module, and the coupled inductors of the series impedance system are accommodated in the at least one impedance module.

8. The power supply assembly according to claim 1, wherein the at least one series impedance member comprises a series impedance member for each supply switch unit such that each supply switch unit is connected in series with a corresponding series impedance member.

9. The power supply assembly according to claim 6, wherein the series impedance member for each supply switch unit comprises conductors electrically connecting the supply switch unit to the primary source connection and the load connection.

10. The power supply assembly according to claim 1, wherein the controllable semiconductor switch of each of the supply switch units has a negative temperature coefficient of resistance.

11. A switch assembly comprising:
a supply switch system having an input and an output, and adapted to controllably provide an electrically conductive connection between the input and the output, and to disconnect said electrically conductive connection, the supply switch system comprising a plurality of supply switch units connected in parallel, each of the supply switch units comprising a controllable semiconductor switch;

a series impedance system having at least one series impedance member and being adapted to provide a balancing voltage drop for each of the parallel connected supply switch units of the supply switch system, wherein the series impedance system is in series with the supply switch system, and the balancing voltage drop is in a range of 30-400 mV at a nominal current of the supply switch unit; and a plurality of supply switch modules such that the supply switch system is accommodated in the plurality of supply switch modules, wherein the at least one series impedance member comprises at least one series inductance member, wherein the supply switch system comprises at least one supply switch unit pair each of which comprises two parallel connected supply switch units of the supply switch system, and the series impedance system comprises a coupled inductor for each of the at least one supply switch unit pair such that each of the coupled inductors comprises a first series inductance member connected in series with one supply switch unit of the supply switch unit pair, and a second series inductance member connected in series with the other supply switch unit of the supply switch unit pair, wherein there is a inductive coupling between the first series inductance member and the second series inductance member.

12. The switch assembly according to claim 11, wherein the plurality of supply switch modules comprises a supply switch module for each supply switch unit such that each supply switch unit is accommodated in a corresponding supply switch module.

* * * * *